July 31, 1962 J. W. GREBBY ET AL 3,046,608
CELLULOSE DERIVATIVE MATERIALS
Filed April 16, 1958 2 Sheets-Sheet 1

INVENTORS
John William Grebby
Selwyn George Hawtin
John Downing
By their attorneys July 31, 1962   J. W. GREBBY ET AL   3,046,608
CELLULOSE DERIVATIVE MATERIALS Filed April 16, 1958                    2 Sheets-Sheet 2

*Inventors*
*John William Grebby*
*Selwyn George Hawtin*
*John Downing*

By their attorneys

Howson and Howson

3,046,608
CELLULOSE DERIVATIVE MATERIALS
John William Grebby, Selwyn George Hawtin, and John Downing, Spondon, near Derby, England, assignors to British Celanese Limited, London, England, a British company
Filed Apr. 16, 1958, Ser. No. 728,765
Claims priority, application Great Britain May 21, 1957
4 Claims. (Cl. 18—48)

This invention relates to cellulose derivative materials and especially to coherent materials having a basis of cellulose acetate and being of low specific gravity owing to the distribution throughout the material of numerous air-spaces. Such materials will be referred to below as foraminous materials. They are particularly useful as heat-insulating materials.

Figure 1:
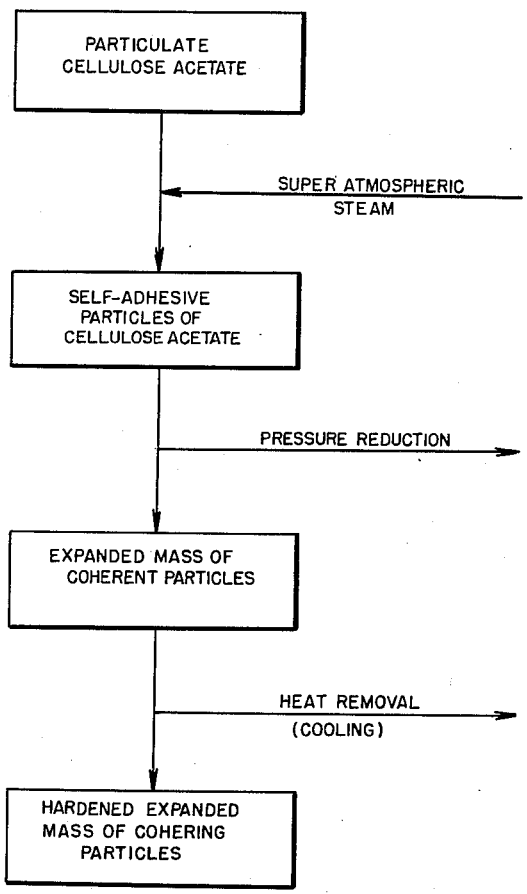
Figure 2:
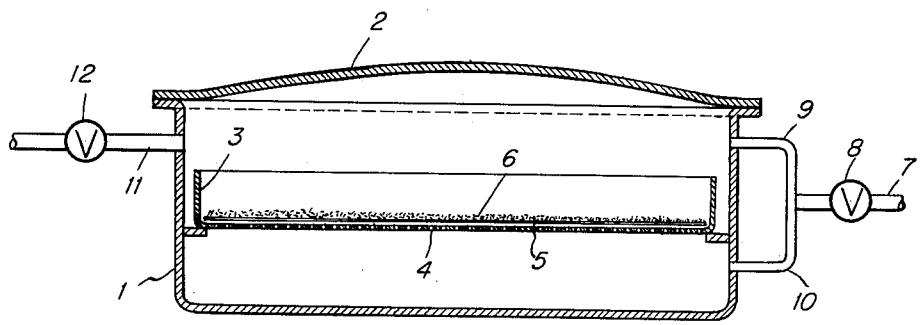

According to the present invention such foraminous materials are made from particulate cellulose acetate of acetyl value of from 40 to 50 percent, the cellulose acetate being of such porosity that it retains at least twice its weight of water when soaked in cold water and allowed to drain. Acetyl values are expressed throughout the specification as weight percentages of combined acetic acid. The foraminous products are obtained by treating a body of the particulate cellulose acetate with steam of superatmospheric pressure until the particles become self-adhesive, reducing the pressure so as to cause the included steam to expand the mass of cohering particles, and cooling said mass in the expanded state to harden it and enable it to retain the expanded form. In the materials so obtained, as a result of diffusion, air occupies the cavities formed by the steam. In the drawings, FIG. 1 is a flow diagram of the process according to the invention and FIG. 2 is a schematic view in vertical section of a suitable apparatus for carrying out the invention.

It is usually of considerable advantage if the particulate cellulose acetate contains a substantial proportion of water at the time it is subjected to the action of the steam. The proportion of water may range from an amount equal to the weight of the cellulose acetate up to that which the cellulose acetate retains when soaked in water and allowed to drain. Smaller proportions are nevertheless helpful.

The cellulose acetate of the desirable degree of porosity can be obtained by running a solution of the cellulose acetate in a water-miscible solvent, particularly acetic acid, into a body of water; preferably the cellulose acetate solution is run in thin streams into the water, the latter being cold. In FIG. 1 the broad process is graphically shown. Referring to that figure, particulate cellulose acetate is subjected to superatmospheric steam to give self adhesive particles of the cellulose acetate. Pressure is then reduced to give an expanded mass of cohering particles which are then cooled to give a hardened expanded mass.

More particularly a very suitable method for obtaining the foraminous material in sheet form is to form a layer of the particulate cellulose acetate, preferably wet with water, in an open-topped mould with a perforate bottom and introduce steam under pressure into a suitable vessel enclosing the mould, to the spaces above and below the mould. When such an arrangement is used the steam can easily penetrate the spaces between the cellulose acetate particles. After a time of exposure sufficient to effect the necessary softening of the cellulose acetate, the pressure may be suddenly reduced and the mould and contents removed and cooled to atmospheric temperature. With such an arrangement the expansion of the material in an upward direction is unrestricted though it may be controlled within certain limits by control of the steam pressure (which, when saturated steam is employed, provides control also of the temperature), duration of the exposure to the steam and proportion of moisture present in the cellulose acetate. A positive control of the expansion may, however, be obtained by providing the mould with a perforate top plate spaced apart from the upper surface of the cellulose acetate by such a distance as to allow the desired degree of expansion.

The following examples illustrate the invention.

Example 1

In a rectangular open topped mould with perforate bottom, lined with paper, a layer of cellulose acetate flake ¼ inch thick was formed. The cellulose acetate was of acetyl value 45.1 percent. The initial moisture content of the flake was 7 percent. Its bulk density was 0.5 gram/cc.

The charged mould was supported within a pressure vessel in such a way as to divide that vessel into two chambers, one above, the other below the mould. The vessel was provided with means for introducing steam under pressure into both chambers simultaneously and means, including a quick-acting outlet valve, for suddenly releasing the pressure in both chambers. The apparatus referred to above is illustrated diagrammatically in FIG. 2 of the accompanying drawing in which 1 is the pressure vessel provided with a removable lid 2. Within the pressure vessel 1 is supported an open-topped mould 3 having a perforated bottom 4. Over the latter lies a sheet of paper 5 and above this the layer of cellulose acetate flake 6. A steam line 7 supplies steam via a valve 8 and branch pipes 9 and 10 to the pressure vessel at points above and below the mould 3. An outlet 11 provided with a quick acting valve 12 serves for permitting the escape of steam from the pressure vessel.

With the mould in place and the outlet valve open, saturated steam under pressure was admitted to both chambers, the outlet valve was closed and the steam pressure allowed to build up to 30 lb./square inch gauge and kept at that value, the temperature being 135° C., for five minutes. The steam was then shut off, the outlet valve was rapidly opened to its full extent and the mould was immediately removed from the vessel and allowed to cool and the sheet of foraminous material was ejected. This was a strong rigid material of apparent density 0.251 gram/cc.

The cellulose acetate used according to the foregoing example was a product obtained as follows:

1 kg. of acetone-soluble cellulose acetate of 54 percent acetyl value was dissolved in a mixture of 2660 cc. of glacial acetic acid and 660 cc. of water. To the solution was added 1160 cc. of water, 750 cc. of glacial acetic acid and 195 cc. of concentrated sulphuric acid. The mixture was then allowed to stand for 10 hours at 25° C. and the sulphuric acid neutralised by addition of 334 grams of magnesium carbonate. The resulting solution was then run in a series of thin streams into cold water and the precipitated product washed with water until substantially free from acetic acid. The product was broken up into small pieces. The resulting cellulose acetate "flake" had an acetyl value of about 45 percent.

*Examples 2 to 10*

The process was carried out as in Example 1 except that the steam pressure, temperature and time of exposure were varied as shown in the following table which also shows the apparent density of the products obtained.

| Example | Steam pressure (lb/square inch gauge) | Temperature (° C) | Time (minutes) | Apparent density (gms./cc.) |
|---|---|---|---|---|
| 2 | 40 | 142 | 5 | 0.186 |
| 3 | 40 | 142 | 10 | 0.184 |
| 4 | 50 | 148 | 5 | 0.111 |
| 5 | 60 | 152 | 10 | 0.101 |
| 6 | 70 | 158 | 10 | 0.083 |
| 7 | 70 | 158 | 15 | 0.072 |
| 8 | 70 | 158 | 30 | 0.166 |
| 9 | 80 | 162 | 5 | 0.091 |
| 10 | 80 | 162 | 10 | 0.067 |

*Examples 11 to 13*

The process was carried out as in Example 10 except that a proportion of water shown in column 2 of the following table was mixed into the cellulose acetate beforehand and that in the case of Example 14, the steam pressure was 95 lb./square inch gauge.

| Example | Weight ratio of water to cellulose acetate | Apparent density (gms./cc.) |
|---|---|---|
| 11 | 2:1 | 0.062 |
| 12 | 3:1 | 0.060 |
| 13 | 4:1 | 0.059 |
| 14 | 6:1 | 0.037 |

Cellulose acetates of acetyl value from 40 to 50 percent are readily softened to the desired extent by saturated steam at temperatures of 135° C. or even less. (Saturated steam at 15 lb./square inch can be used, for instance.) It is preferred to work with saturated steam at a temperature from 120 to 170° C. and with times of contact with the cellulose acetate ranging up to 20 or 30 minutes.

The process of the invention enables strong light-weight products to be obtained without the use of a plasticiser, volatile solvent or other softening agent other than steam.

Foraminous materials according to the invention may be used as heat-insulating material, e.g. between floors in buildings, between double walls in huts, in the construction of refrigerators and in packaging refrigerants, as sound-insulating material in buildings, as a filling for buoyancy tanks in boats and rafts, and as packing material between two load-carrying members in built-up light-weight structural members. Where desirable the material may be moulded to shape during the expansion step.

What we claim is:

1. A process for the production of a coherent foraminous product which comprises forming a loose and substantially unconfined body of particles of cellulose acetate having an acetyl value of 40 to 50 percent, said cellulose acetate being capable of retaining at least twice its weight of water when soaked in cold water and allowed to drain, bringing said body of cellulose acetate into direct contact with saturated steam at a temperature between about 120° C. and about 170° C., maintaining said steam in contact with said cellulose acetate for a time sufficient for said steam to penetrate the particles and to cause the particles to become self-adhesive, the steam treatment being effected while the body of cellulose acetate is free to expand, and suddenly reducing the pressure of the steam thereby causing the steam which had penetrated the particles of the cellulose acetate to expand and so expand the adherent particles.

2. A process according to claim 1, wherein the cellulose acetate has an acetyl value of about 45 percent.

3. A process according to claim 2, wherein the cellulose acetate is wet with water at the time of contacting it with the steam.

4. A process according to claim 2, wherein the body of particulate cellulose acetate is in the form of a layer of substantially uniform thickness whereby a product of sheet form is obtained.

References Cited in the file of this patent

UNITED STATES PATENTS

| | | |
|---|---|---|
| 2,145,731 | Minor | Jan. 31, 1939 |
| 2,354,260 | Haney et al. | July 25, 1944 |
| 2,763,897 | Gates et al. | Sept. 25, 1956 |